Feb. 25, 1930.  G. S. PALMER ET AL  1,748,654
FILTER
Filed Sept. 18, 1928
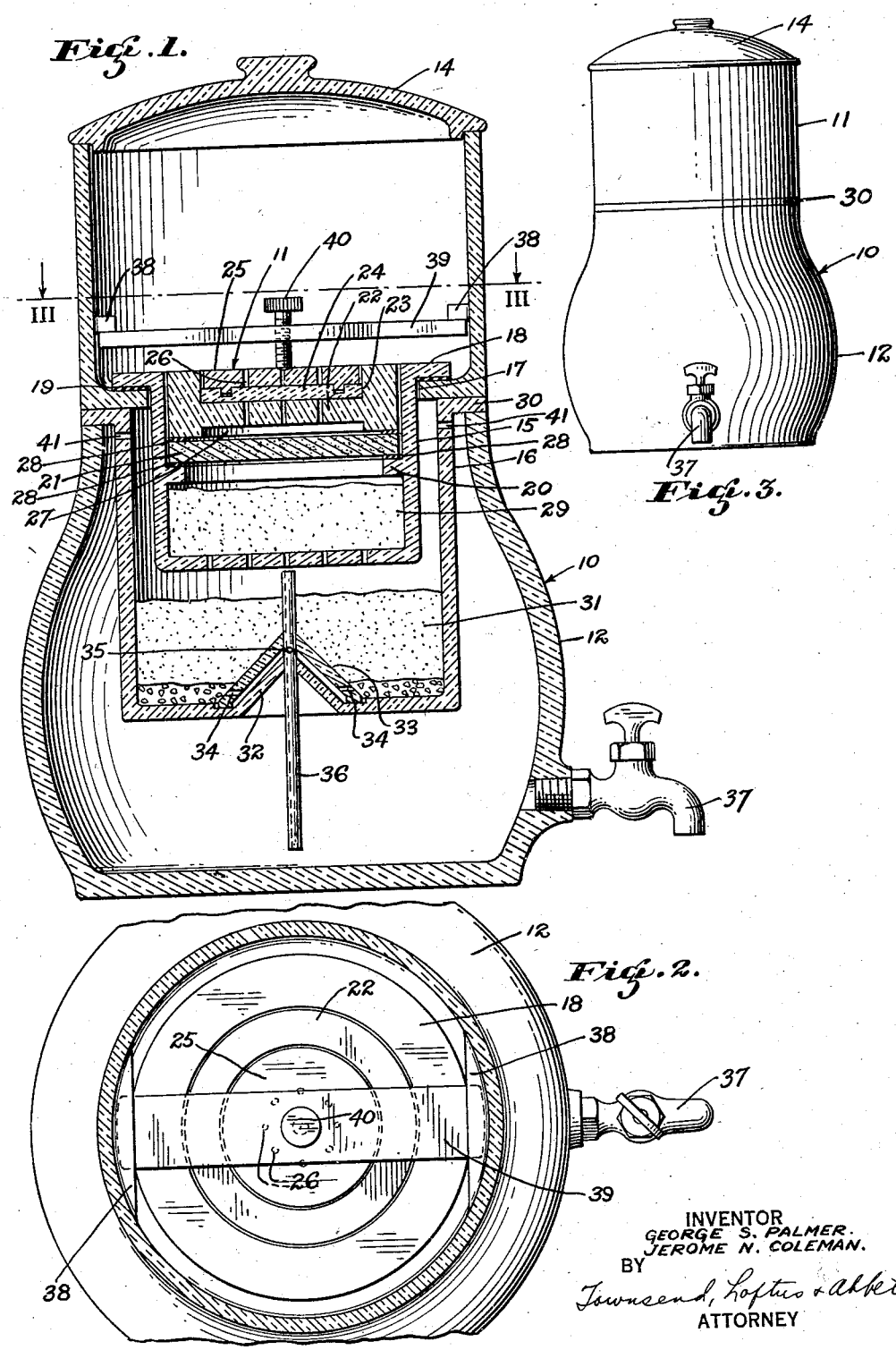
INVENTOR
GEORGE S. PALMER.
JEROME N. COLEMAN.
BY
Townsend, Loftus & Abbett
ATTORNEY Patented Feb. 25, 1930

1,748,654

UNITED STATES PATENT OFFICE

GEORGE S. PALMER, OF OAKLAND, AND JEROME N. COLEMAN, OF ALAMEDA, CALIFORNIA

FILTER

Application filed September 18, 1928. Serial No. 306,743.

This invention relates to filters and particularly pertains to an apparatus for filtering and aerating drinking water.

It is the principal object of the present invention to generally improve devices of the character referred to whereby to provide a simple and inexpensive filtering apparatus adapted to expeditiously and thoroughly filter and aerate water and which is designed so that the parts thereof and the filtering mediums used may be easily and quickly cleansed.

One form which the invention may assume is exemplified in the following description and illustrated by way of example in the accompanying drawing, in which:

Fig. 1 is an enlarged central vertical section through a filter embodying the preferred form of our invention.

Fig. 2 is a view in elevation of the same.

Fig. 3 is a plan section taken on line III—III of Fig. 1.

Referring more particularly to the accompanying drawings, 10 indicates a filter comprising a primary reservoir 11 and a secondary reservoir 12. The primary reservoir is fitted with a cover 14 so that the water to be filtered may be emptied therein. Filtering mediums as will be described are interposed between the primary reservoir 11 and the secondary reservoir 12 to thoroughly filter and aerate the water emptied into the primary reservoir so that the water withdrawn from the secondary reservoir 12 will be thoroughly filtered and aerated.

The filtering mediums are arranged within two concentrically disposed cylindrical containers 15 and 16 which are of different diameters. The upper ends of these containers 15 and 16 are open as illustrated. The container 15 comprises a primary filtering chamber while the container 16 constitutes a secondary filtering and aerating chamber as will be described.

From Fig. 1 it will be seen that the bottom of the primary reservoir 11 is formed with a central circular opening 17 of a diameter slightly larger than the exterior diameter of the container 15 and that the container 15 is suspended through this opening and is supported in relation to the reservoir 11 by means of an exteriorly projecting annular flange 18 which circumscribes the upper end of the container 15. This flange 18 bears on the bottom of the reservoir 11 at the margin of the opening 17. A gasket 19 is interposed between the flange 18 and the bottom of the primary reservoir 11 so as to prevent the passage of water between this joint, necessitating that the water pass through the container 15.

Intermediate its ends the container 15 is formed with an inwardly projecting flange or annular shoulder 20 upon which a filter stone 21 rests. This filter stone is circular and is of a diameter just slightly less than the interior diameter of the container 15. The filter stone is held in place by a pad holder 22 which is also circular and inserted within the upper end of the container 15. This pad holder is formed with a counterbore 23 which receives an asbestos filter pad 24. A cover 25 also fits within the counterbore 23 and bears against the filter pad 24 to hold the same in position.

A plurality of passageways or perforations 26 are formed through the cover 25 and through the bottom of the pad holder 22 so that the water contained within the primary reservoir 11 will pass through the cover 25, through the filter pad 24 and thence through the pad holder to a chamber 27 between the pad holder and the filter stone.

Gaskets 28 are interposed between the pad holder 22 and the filter stone and between the filter stone and the annular shoulder or flange 20 in the container 15. These gaskets 28 prevent the water from passing through the container 15 except through the filter stone.

Within the chamber 15 below the shoulder or flange 20 is a compartment 29 containing charcoal or equivalent filtering medium. The bottom of the container 15 is perforated so that the water passing through the charcoal may pass through the container 15 to a point within the container 16. This container is somewhat larger in diameter than the container 15 so that the container 15 may be suspended within the container 16 as illustrated.

The upper end of the container 16 is formed with a circumscribing flange 30 which is interposed between the bottom of the primary reservoir 11 and the top of the secondary reservoir 12.

The container 16 is somewhat deeper than the container 15 so that a compartment 31 will be formed between the bottom of the container 15 and the bottom of the container 16. Filter sand and gravel is disposed in this compartment 31 as illustrated.

The bottom of the container 16 is formed with a conical center portion 32 which projects upwardly into the container as illustrated in Fig. 1. This conical portion and the bottom of the container 16 are imperforate. Arranged over the conical portion 32 is a cone 33 constructed so that its inner surface will be spaced from the interior surface of the conical portion 32. Adjacent the base of the cone 33 it is formed with a series of perforations 34 so that the water passing through the filter sand and gravel may enter the space between the cone 33 and the conical portion 32 of the bottom of the container 16. The water may then pass upwardly in this space to the apex of the cone where it may enter through ports 35 into a pipe 36 which extends vertically through the conical portion 32 and cone 33. The ends of this pipe are open and the upper end thereof extends to a point above the filter sand and gravel, and the lower end terminates short of the bottom of the secondary reservoir 12. The water passing through the perforations 34 to the space between the cone 33 and the conical portion 32 must travel upwardly to the apex of the cone before entering the pipe 36 and discharging into the secondary reservoir 12. This prevents any sand from being carried from the compartment 31 to the secondary reservoir 12.

The water passing through the ports 35 into the pipe 36 creates a slight suction at the upper end of the pipe, causing air to travel down the pipe and mingle with the water, thoroughly aerating the same. This, as is well known, is a considerable advantage in the purification of drinking water.

The water may be withdrawn from the secondary reservoir 12 for use in any preferred manner. In this instance we show a spigot 37 communicating with the interior of the secondary reservoir 12 at the bottom thereof.

It will be noticed that all of the parts of the present filter are merely set in place and therefore some means must be provided for clamping the same together to prevent displacement. The means here shown comprises a pair of lugs 38 arranged at diametrically opposite points within the primary reservoir 11. A transverse bar 39 is provided which is of a length slightly less than the interior dimension of the primary reservoir 12 but longer than the spacing between the lugs 38. A compression screw 40 projects through this bar at the center thereof and bears against the filter pad holder which is disposed within the upper end of the container 15.

When the ends of the bar 39 are engaged with the underside of the lugs 38, the pressure of the screw 40 will be sufficient to clamp the container 15 and the parts carried therein in place. The weight of the primary reservoir 11 and its associate elements bears directly on the flange 30 of the container 16 which abuts on the upper end of the secondary reservoir 12. The weight of the parts mentioned is sufficient to maintain the parts in their proper relation under normal circumstances.

In operation of the device, it is assembled as shown in the drawings and the water to be filtered is placed in the primary reservoir 11. This water will pass through the perforations in the cover 35 thence through the filter pad 24 through the perforations in the filter pad holder to the chamber 27 between the filter pad holder and the filter stone. The water will then filter through the filter stone, pass through the charcoal in the compartment 29 and through the perforated bottom of the container 15.

After passing from the container 15 into the container 16 the water will pass through the filter sand and gravel and enter through the perforations 34 to the space between the cone 33 and the conical portion 32 of the bottom of the container 16. The water will then travel upwardly to the apex of the cone and enter the pipe 36 through the ports 35. The passage of water downwardly through the pipe will create a slight siphoning or suction action at the upper end of the pipe, causing air to be withdrawn into the pipe to mingle with the water passing through the pipe. This will cause the water to be aerated which aids in its purification.

In the event that the filter should become clogged, overflow ports 41 are provided at the top of the container 16 so that the water may pass directly into the secondary reservoir 12 without passage through the filter sand.

One of the principal features of the present invention is its construction and the manner of assembling it, so that all of the parts may be quickly removed for cleansing. This may be done by the housewife as it is only necessary to disengage the bar 39 from the lugs 38 and then withdraw the container 15 from the primary reservoir 11. The pad 24, the filter stone 21 and the charcoal compartment 29 may then be thoroughly cleansed and sterilized. The primary reservoir 11 may then be removed so that the container 16 may be removed and the filter sand and gravel cleansed and replaced. The parts may then be quickly set in their proper relative positions and the ends of the bar 39 reengaged with the lugs 38. Thus the filter will be ready for use.

It is obvious therefore that the present filter is considerably improved over prior filters of the same type as it may be readily and quickly cleansed and does not need an expert to disassemble it and cleanse or replace the filtering mediums.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. A filter of the class described comprising a primary reservoir, a secondary reservoir, filtering means removably suspended from the primary reservoir and through which water will pass by gravity to the secondary reservoir, said filtering means comprising a container suspended from the primary reservoir, said container having a filter pad, a charcoal compartment and a filter stone interposed between the charcoal compartment and the pad, and means for removably clamping the filter pad and the filter stone in the container and simultaneously clamping the container to the primary reservoir.

2. A filter of the class described comprising a primary reservoir, a secondary reservoir, filtering means removably suspended from the primary reservoir and through which water will pass by gravity to the secondary reservoir, said filtering means comprising a container suspended from the primary reservoir, said container having a filter pad, a charcoal compartment and a filter stone interposed between the charcoal compartment and the pad, and means for removably clamping the filter pad and the filter stone in the container and simultaneously clamping the container to the primary reservoir, said clamping means comprising lugs projecting inwardly from the sides of the reservoir at diametrically opposed points, a transverse bar adapted to engage the bottom of the lugs, and a clamping screw projecting through the bar and engaging the container.

3. A filter of the class described comprising a primary reservoir, a secondary reservoir upon which the primary reservoir is positioned, said primary reservoir having an opening formed through its bottom, a container having a circumscribing flange suspended through said opening with the flange bearing around the margin of the opening, the bottom of said container being perforated, filtering mediums in said container, means for simultaneously clamping the filtering mediums in the container and clamping the container to the primary reservoir, a secondary container arranged concentrically to the first-named container, said secondary container having a flange interposed between the meeting faces of the primary and secondary reservoirs, said secondary container having a filtering medium therein through which the water passing from the first container will pass, and means for aerating the water as it discharges from the secondary container into the secondary reservoir.

4. A filter of the class described comprising a primary reservoir, a secondary reservoir upon which the primary reservoir is positioned, said primary reservoir having an opening formed through its bottom, a container having a circumscribing flange suspended through said opening with the flange bearing around the margin of the opening, the bottom of said container being perforated, filtering mediums in said container, means for simultaneously clamping the filtering mediums in the container and clamping the container to the primary reservoir, a secondary container arranged concentrically to the first-named container, said secondary container having a flange interposed between the meeting faces of the primary and secondary reservoirs, said secondary container having a filtering medium therein through which the water passing from the first container will pass, means for aerating the water as it discharges from the secondary container into the secondary reservoir, said means comprising a pipe extending vertically through the bottom of the secondary container having ports intermediate its ends through which the water enters the pipe from the secondary container, the upper end of the pipe extending above the filter medium, and the lower end of the pipe extending short of the bottom of the secondary reservoir.

5. A filter of the class described comprising a primary reservoir, a secondary reservoir arranged therebeneath, said primary reservoir having a circular opening formed through the bottom thereof, a container suspended through said opening, said container having a circumscribing flange at its upper end bearing on the bottom of the primary reservoir at the marginal edge of the opening, a second container of a diameter larger than the first-named and arranged concentric thereto, said second container being suspended within the secondary reservoir, a flange circumscribing the upper end of said secondary container and bearing on the top of the secondary reservoir, the primary reservoir being set on said flange of the secondary container, said first and secondary containers being equipped with removable filtering mediums, means for simultaneously clamping the filtering mediums in position within the first container and clamping the first container to the primary reservoir, said containers being adapted to permit water to pass from the primary reservoir through the filtering mediums in the containers and thence into the second reservoir by gravity.

6. A filter of the class described comprising a primary reservoir, a secondary reservoir arranged therebeneath, said primary reservoir having a circular opening formed through the bottom thereof, a container suspended through said opening, said container having a circumscribing flange at its upper end bearing on the bottom of the primary reservoir at the marginal edge of the opening, a second container of a diameter larger than the first-named and arranged concentric thereto, said second container being suspended within the secondary reservoir, a flange circumscribing the upper end of said secondary container and bearing on the top of the secondary reservoir, the primary reservoir being set on said flange of the secondary container, said first and secondary containers being equipped with removable filtering mediums, means for simultaneously clamping the filtering mediums in position within the first container and clamping the first container to the primary reservoir, said containers being adapted to permit water to pass from the primary reservoir through the filtering mediums in the containers and thence into the second reservoir by gravity, and means carried by the second container for aerating the water as it passes from the second container to the secondary reservoir.

GEORGE S. PALMER.
JEROME N. COLEMAN.